United States Patent
Schaefer

(10) Patent No.: US 9,151,061 B2
(45) Date of Patent: Oct. 6, 2015

(54) METHOD AND A DEVICE TO ATTACH BUILDING TRIMS

(71) Applicant: Fiber Cement Foam Systems Insulation, LLC, Manalapan, NJ (US)

(72) Inventor: Russ Schaefer, Manalapan, NJ (US)

(73) Assignee: FIBER CEMENT FOAM SYSTEMS INSULATION, LLC, Manalapan, NJ (US)

( * ) Notice: Subject to any disclaimer, the term of this patent is extended or adjusted under 35 U.S.C. 154(b) by 0 days.

(21) Appl. No.: 14/047,407

(22) Filed: Oct. 7, 2013

(65) Prior Publication Data

US 2014/0096472 A1 Apr. 10, 2014

Related U.S. Application Data

(60) Provisional application No. 61/710,234, filed on Oct. 5, 2012, provisional application No. 61/788,847, filed on Mar. 15, 2013.

(51) Int. Cl.
| | |
|---|---|
| *E04F 13/28* | (2006.01) |
| *E04F 13/14* | (2006.01) |
| *E04F 13/08* | (2006.01) |

(52) U.S. Cl.
CPC ............ *E04F 13/28* (2013.01); *E04F 13/083* (2013.01); *E04F 13/0805* (2013.01); *E04F 13/0875* (2013.01); *E04F 13/148* (2013.01); *Y10T 24/30* (2015.01)

(58) Field of Classification Search
CPC ....... E04F 19/02; E04F 21/00; E04F 13/0841; E04F 13/083; E04F 13/28; E04F 13/21; E04F 13/072; E04F 13/08; E04F 13/147; E04F 13/0801; E04B 2/82; E04B 2/7457; E04B 1/7629

USPC ........... 52/520, 543–544, 548, 549, 287.1, 52/288.1, 506.01, 506.02, 506.03, 506.05, 52/506.06, 716.1, 716.3, 716.4, 716.8, 52/717.01, 717.05, 717.06, 718.01, 52/718.04, 718.06, 712–713, 656.1, 656.9, 52/211, 213, 204.54, 508, 510–512, 235, 52/489.1, 489.2, 217; 403/252, 254, 403/360–361; 24/292–295, 297, 306; 160/392

See application file for complete search history.

(56) References Cited

U.S. PATENT DOCUMENTS

| | | | | |
|---|---|---|---|---|
| 3,420,003 | A | * | 1/1969 | Cline .............................. 49/505 |
| 3,545,135 | A | * | 12/1970 | Lieber ............................ 49/505 |
| 3,745,736 | A | * | 7/1973 | Fischer et al. .................. 52/511 |
| 3,916,577 | A | | 11/1975 | Vare |
| 3,992,845 | A | | 11/1976 | Grzesiek et al. |
| 4,143,498 | A | | 3/1979 | Martin, Jr. et al. |
| 4,385,850 | A | * | 5/1983 | Bobath ........................ 403/205 |
| 4,400,922 | A | | 8/1983 | Boyer |
| 4,472,862 | A | * | 9/1984 | Bloomfield et al. ............ 24/460 |
| 4,589,229 | A | * | 5/1986 | Warren ........................... 49/505 |

(Continued)

FOREIGN PATENT DOCUMENTS

CA 1290544 10/1991

*Primary Examiner* — Beth Stephan
(74) *Attorney, Agent, or Firm* — Gearhart Law, LLC

(57) ABSTRACT

This disclosure relates to building materials, in particular to attachment of insulating board and trims on building surfaces. Various embodiments of attachment clips to attach the trims on their place without nails or screws through the trim are provided. This disclosure provides an economical, fast, easy, and esthetic method to attach building trims.

8 Claims, 7 Drawing Sheets

(56) References Cited

U.S. PATENT DOCUMENTS

| | | | |
|---|---|---|---|
| 4,649,689 A | 3/1987 | Everman et al. | |
| 5,058,323 A * | 10/1991 | Gerritsen | 49/504 |
| 5,070,651 A * | 12/1991 | Jeter | 49/505 |
| 5,096,753 A * | 3/1992 | McCue et al. | 428/31 |
| 5,187,898 A * | 2/1993 | McKann | 49/505 |
| 5,222,343 A * | 6/1993 | Anderson | 52/718.04 |
| 5,226,274 A | 7/1993 | Sommerstein | |
| 5,233,802 A * | 8/1993 | Rogers | 52/212 |
| 5,323,577 A | 6/1994 | Whitmyer | |
| 5,336,849 A * | 8/1994 | Whitney | 174/72 C |
| 5,345,722 A * | 9/1994 | McKann | 49/505 |
| 5,365,707 A | 11/1994 | Jones et al. | |
| 5,412,909 A * | 5/1995 | Wu | 49/505 |
| 5,606,835 A | 3/1997 | Champagne | |
| 5,715,638 A * | 2/1998 | Anderson, Sr. | 52/506.08 |
| 5,735,097 A * | 4/1998 | Cheyne | 52/489.1 |
| 5,752,356 A * | 5/1998 | Miklavic et al. | 52/718.02 |
| 5,809,709 A * | 9/1998 | Ryan et al. | 52/222 |
| 5,836,113 A * | 11/1998 | Bachman | 52/94 |
| 5,934,030 A * | 8/1999 | McDonald | 52/204.1 |
| 6,088,979 A * | 7/2000 | Neal | 52/212 |
| 6,115,982 A * | 9/2000 | Lindenberg | 52/506.05 |
| 6,148,584 A * | 11/2000 | Wilson | 52/717.01 |
| 6,481,942 B2 | 11/2002 | Tanaka | |
| 6,725,619 B1 | 4/2004 | Barber | |
| 6,976,342 B1 | 12/2005 | Kowalevich | |
| 7,441,382 B2 * | 10/2008 | Beck et al. | 52/543 |
| 7,533,503 B2 * | 5/2009 | Wang | 52/217 |
| D600,543 S | 9/2009 | Coles | |
| 7,581,364 B2 | 9/2009 | Godby | |
| 7,600,794 B2 | 10/2009 | Ramsauer | |
| 7,698,867 B1 * | 4/2010 | Stucko et al. | 52/548 |
| 7,856,790 B2 | 12/2010 | Jambois et al. | |
| 7,870,697 B2 * | 1/2011 | Galas | 52/211 |
| 7,987,650 B2 | 8/2011 | Pollack | |
| 8,056,602 B1 * | 11/2011 | Green | 160/392 |
| 8,069,622 B2 * | 12/2011 | Mees et al. | 52/213 |
| 8,099,837 B2 | 1/2012 | Santin et al. | |
| 8,117,801 B2 | 2/2012 | Jambois et al. | |
| 8,161,706 B2 | 4/2012 | Gingras | |
| 8,490,350 B1 * | 7/2013 | Greely et al. | 52/213 |
| 2009/0013636 A1 * | 1/2009 | Wilson | 52/718.01 |
| 2009/0107084 A1 | 4/2009 | Hutchings | |
| 2009/0241458 A1 | 10/2009 | Das | |
| 2010/0037552 A1 | 2/2010 | Bronner | |
| 2011/0154751 A1 * | 6/2011 | Gumpert | 52/200 |
| 2011/0179733 A1 * | 7/2011 | Picken | 52/242 |
| 2011/0210223 A1 | 9/2011 | Nishiro | |
| 2011/0302865 A1 * | 12/2011 | Kliegle et al. | 52/483.1 |
| 2012/0055109 A1 | 3/2012 | Labonte et al. | |
| 2012/0151861 A1 * | 6/2012 | Mulhair | 52/506.05 |
| 2012/0186170 A1 * | 7/2012 | Macdonald et al. | 52/173.3 |
| 2012/0222383 A1 * | 9/2012 | Cashman | 52/717.01 |

\* cited by examiner

METHOD AND A DEVICE TO ATTACH BUILDING TRIMS

PRIORITY

This application claims priority of U.S. provisional applications 61/710,234 filed on Oct. 5, 2012 and 61/788,847 filed Mar. 15, 2013, both of which are incorporated herein by reference in their entirety.

FIELD OF THE INVENTION

The invention relates to building materials, in particular to attachment of insulating board and trims on building surfaces.

BACKGROUND OF THE INVENTION

The present invention relates to building materials in particular to attachment of insulating board and trims on building surfaces.

The selection of building siding materials today is vast. The siding may be wood, vinyl, fiber cement, fiber glass or other materials. Essential today is to have insulation underneath the siding to save in energy costs and to protect the building structures from weather elements. Customarily the insulation layer is attached to the building first and the siding is attached on top of the insulation layer.

Once the siding elements are attached on top of the insulation boards, the siding still needs to be trimmed. The trims are usually narrower boards and they are used to finalize the look. It is important that the insulation extends under the trim boards also. Lack of insulation, especially around windows allows hot and cold air to leak and may cause high energy costs.

The usual practice today is that after the insulation boards have been attached to the building sides, the siding boards are attached to the insulation boards and after this smaller board of insulation are attached around the windows, close to the roof, or at the house corners and the look is finalized by attaching trim boards. This is usually done by nailing the trim boards on their place. The trim boards are needed even if no insulation boards are used.

There is a need for an easy and economic way to attach the trim boards, and this application provides such easy and economic way. Furthermore, there is a need for attaching trim boards without leaving the nail heads visible on the board. Thus there is a need for an easy, fast, cost effective, and esthetic way to attach the trim boards.

SUMMARY OF THE INVENTION

It is an object of this invention to provide an easy, economic and an esthetic way to attach trim boards on the building.

It is another object of this invention to provide means to attach trim boards on the building without making through holes on the trim boards.

It is another object of this invention to provide a ready to use combination of trim board and insulation layer to be attached on the building side.

A further object of this invention is to provide clips for attaching trims on buildings without making through holes on the trims.

Another object is to provide an adjustable clip for attaching trim boards on building.

It is an object of this invention to provide an adjustable trim clip for attaching a siding trim on a wall structure, said clip comprising; a first part having a vertical side with a first end and a second end, said first end being attached to a flat bottom and said second end being attached to a horizontal prong extending to same direction as the flat bottom; a second part having a vertical side with a first end and a second end, said first end being attached to a flat bottom and said second end being attached to a horizontal prong extending to same or different direction as the flat bottom; and wherein the flat bottom of the second part slides on top or under the flat bottom of the first part, thereby forming a clip that has an adjustable width.

It is another object of this invention to provide a method to attach a siding trim on a wall, said method comprising the steps of: a) providing at least one trim clip having two vertical sides connected together with a substantially flat bottom having a width substantially similar to the width of the siding trim, b) attaching the trim clip on the wall structure; c) inserting the siding trim into the clip between the vertical sides; and d) providing a pressure by the vertical sides to the trim such that the trim stays securely between the sides.

It is yet another embodiment of this invention to provide a trim clip for attaching a siding trim on a wall structure, said clip comprising; two vertical sides connected together with a substantially flat bottom having a width substantially similar to the width of the siding trim, wherein the bottom has attachment holes or a female/male attachment assembly, and wherein the trim clip is attached to the wall structure with fasteners through the attachment holes or with female/male attachment means, and wherein the siding trim is inserted into the clip between the side walls and hold in place by a pressure provided by the side walls.

A further object of this invention is to provide a method to attach a siding trim on a wall, said method comprising the steps of providing a set of mounting clips having a wall mounting clip and a trim mounting clip, said clips forming a male/female attachment device; attaching said wall mounting clip on the wall and said trim mounting clip on the trim; and attaching the siding trim to the wall by allowing the wall mounting clip and the trim mounting clip form a male/female attachment.

It another object of this invention to provide building trim kit, comprising a siding trim having a front side and a back side, said back side having one or more trim mounting clips attached; one or more wall mounting clips to be attached to a wall, and said trim mounting clips and wall mounting clips forming a male/female attachment device.

DETAILED DESCRIPTION OF THE INVENTION

Figure 1A:
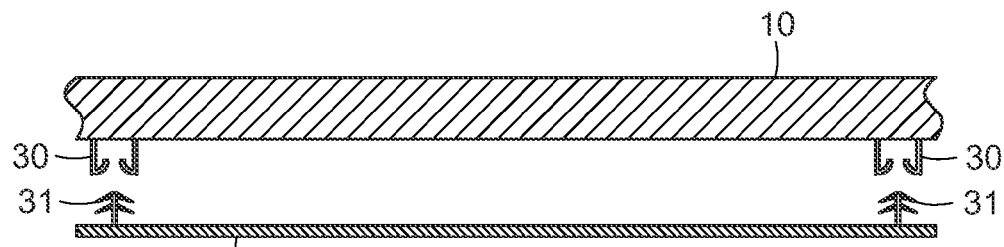
FIG. 1A is a horizontal cross section showing a wall and a trim and the mounting clips.

The preferred embodiments of the present invention will now be described with reference to FIGS. 1-10 of the drawings. Identical elements in the various figures are identified with the same reference numerals.

FIG. 1A is a horizontal cross section showing a wall and a trim and the mounting clips. The figure shows a wall 10, a trim board 20, wall mount clips 30 and trim mount clips 31.

Figure 1B:
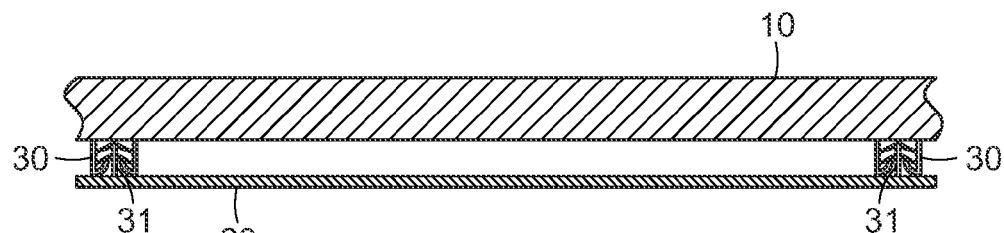
FIG. 1B is a horizontal cross section showing the trim attached to the wall with the mounting clips.

FIG. 1B is a horizontal cross section showing the trim attached to the wall with the mounting clips. The figure shows a wall 10, a trim board 20, wall mount clips 30 and trim mount clips 31.

Figure 2:
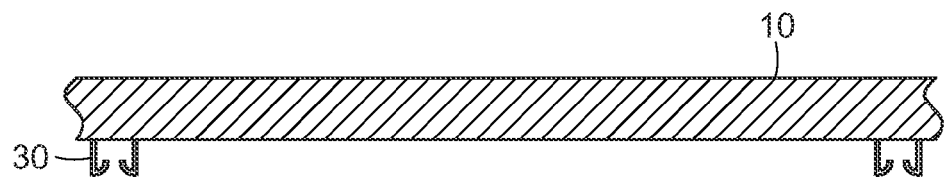
FIG. 2 is a horizontal cross section showing a wall, a trim that is attached to an insulation board and the mounting clips.
Figure 2:
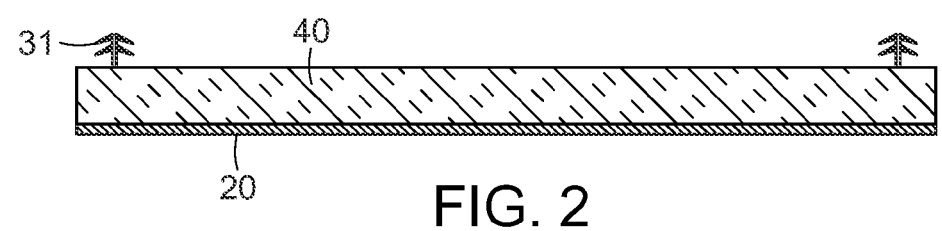

FIG. 2 is a horizontal cross section showing a wall, a trim that is attached to an insulation board and the mounting clips. The figure shows a wall 10, a trim 20, an insulation board 40, wall mount clips 30 and trim mount clips 31. The insulation board 40 may be glued on the trim 20.

Figure 3:
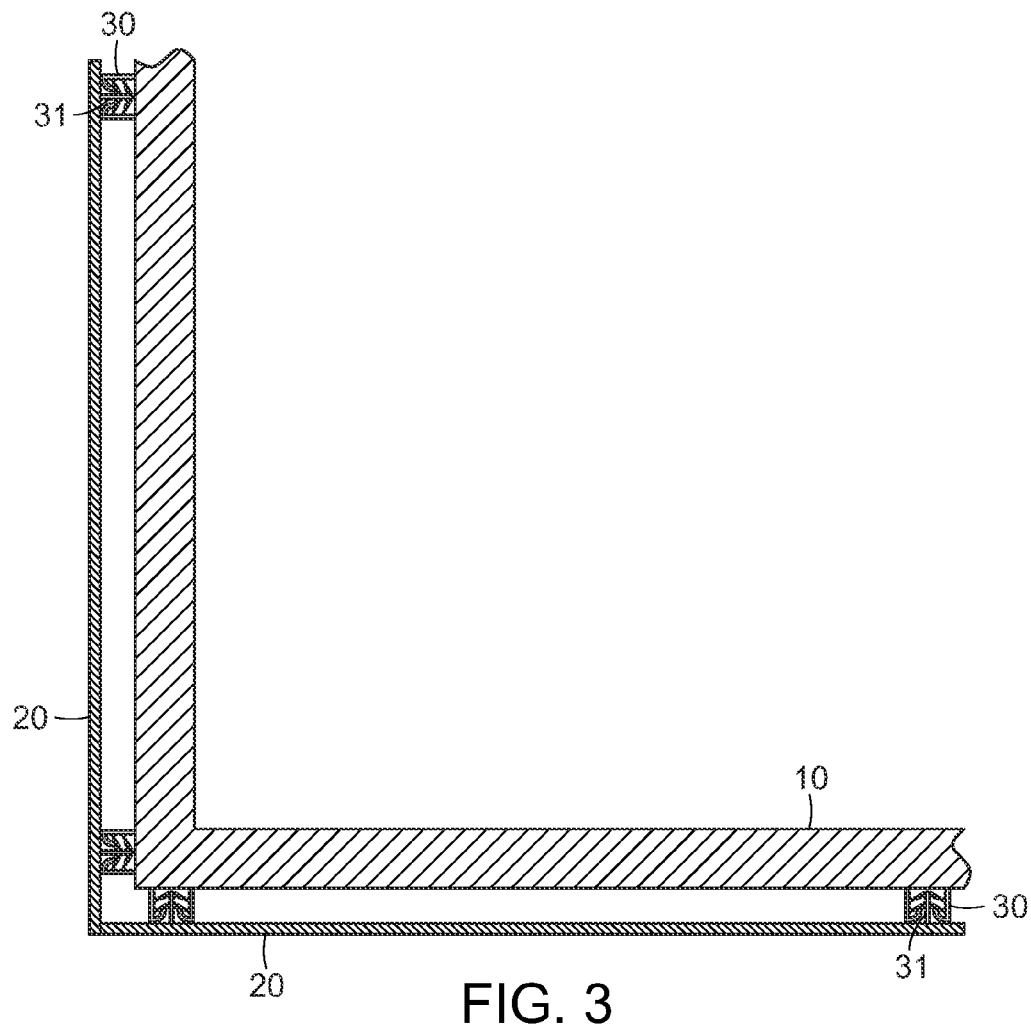
FIG. 3 is a horizontal cross section of a house corner, showing the walls, the trims and the mounting clips.

FIG. 3 is a horizontal cross section of a house corner, showing the walls, the trims and the mounting clips. The figure shows the walls 10, the trims 20, the wall mount clips 30 and the trim mount clips 31.

Figure 4:
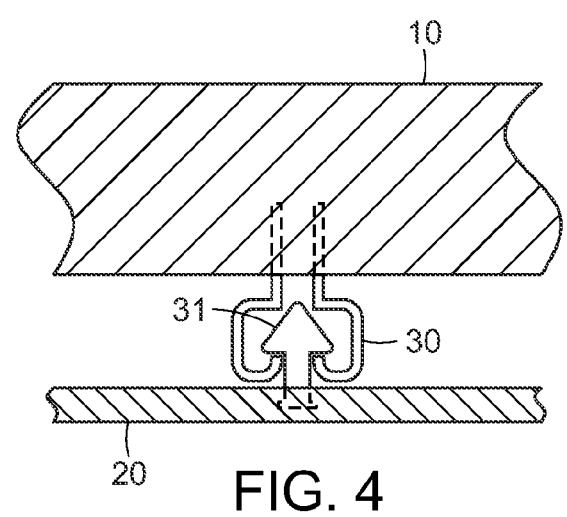
FIG. 4 is a horizontal cross section showing a trim attached to the wall with the mounting clips. The mounting clips form a male/female attachment device.

FIG. 4 is a horizontal cross section showing a trim attached to the wall with the male/female mounting clips. The figure shows the wall 10, the trim 20, the wall mount clip 30 and the trim mount clip 31.

Figure 5:
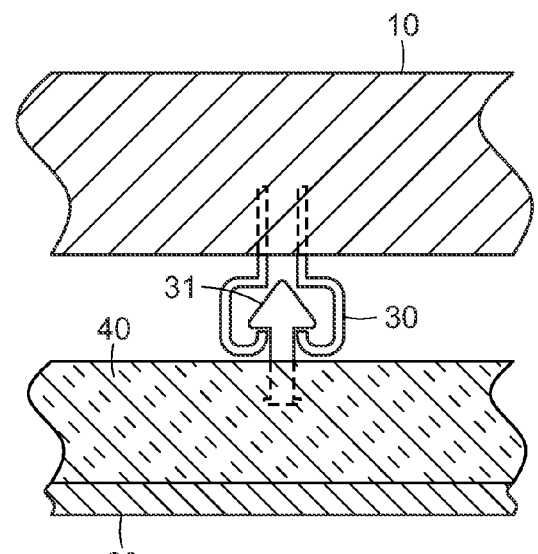
FIG. 5 is a horizontal cross section showing a wall, a trim attached to an insulation board attached to the wall with the male/female mounting clips.

FIG. 5 is a horizontal cross section showing a wall, a trim attached to an insulation board attached to the wall with the mounting clips. The figure shows a wall 10, a trim 20, an insulation board 40, a wall mount clip 30 and a trim mount clip 31.

Figure 6:
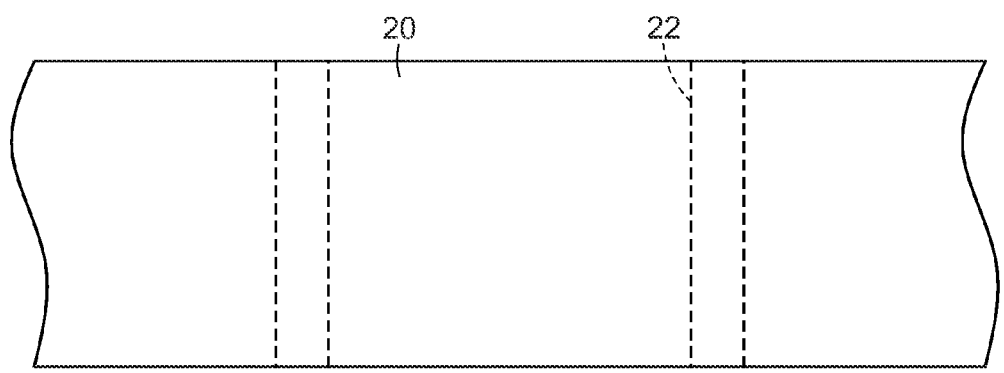
FIG. 6 is a front view of a trim board and markings on the trim board to show where the mounting clips locate.

FIG. 6 is a front view of a trim board 20 showing markings 22 indicating where the mounting clips locate.

Figure 7A:
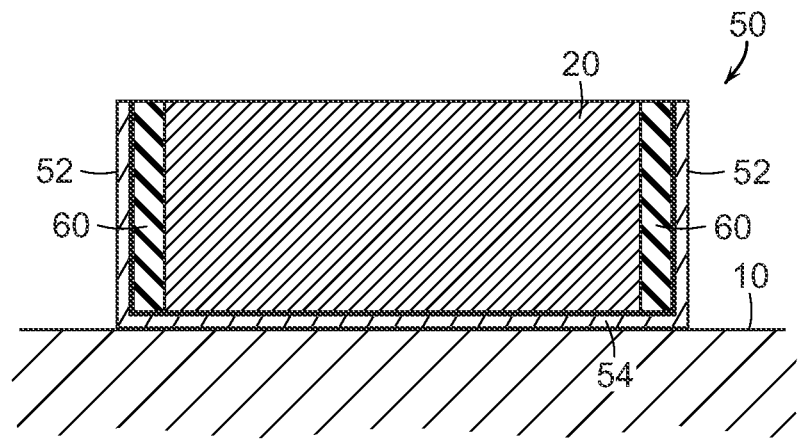
FIG. 7A shows an end view of a trim attached on a wall or insulation with a trim clip having rubber lining.

FIG. 7A is an end view of another trim clip embodiment. The figure shows a substantially U-formed clip 50, having two vertical sides 52 and a horizontal bottom 54. The vertical sides have an inner rubber lining 60. The figure shows the trim 20 inserted into the clip. The clip 50 is attached to the wall 10 from its bottom 54.

Figure 7B:
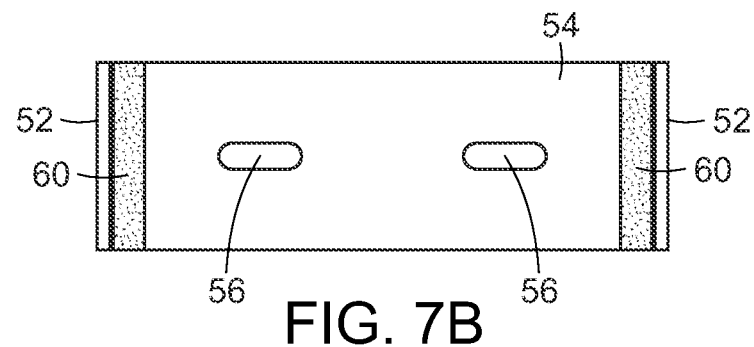
FIG. 7B shows a top view of a trim clip with attachment holes.

FIG. 7B shows a top view of the clip 50 of FIG. 7A. The figure shows the vertical sides 52, the rubber lining 60, the bottom part 54 and attachment holes 56 in the bottom 54.

Figure 7C:
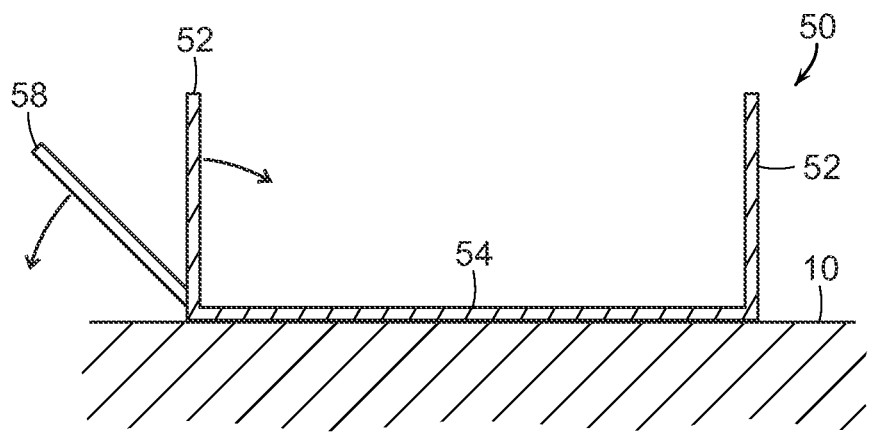
FIG. 7C shows a side view of a trim clip with a squeezing lever.

FIG. 7C shows another embodiment of the clip 50. The figure shows the vertical sides 52, the horizontal bottom 54 and a squeezing lever 58. The clip is attached to a wall 10.

Figure 8A:
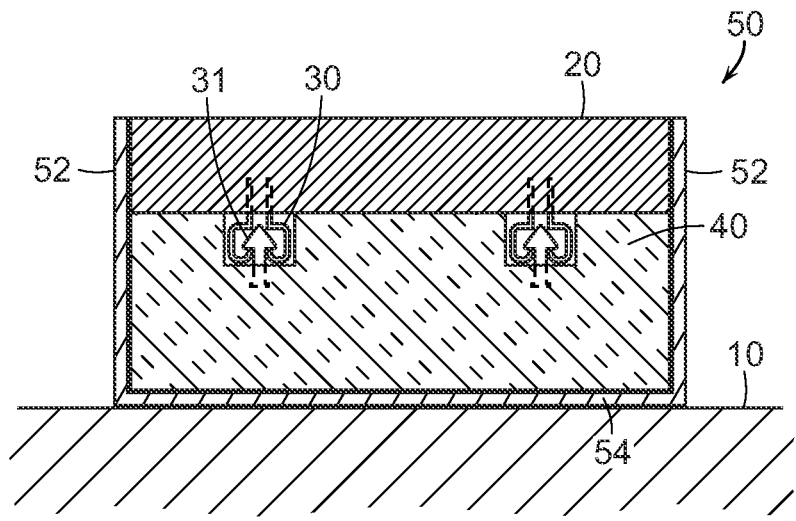
FIG. 8A shows a trim clip for attachment of a trim-insulation combination, where the trim is attached on the insulation with male-female attachments.

FIG. 8A shows another embodiment of the clip 50. The figure shows the vertical sides 52, the bottom 54, a trim 20, an insulation board 40 and mounting clips 30 and 31. The trim 20 is attached to the insulation board with the mounting clips and the trim/insulation combination is inserted into the clip which is attached to the wall 10.

Figure 8B:
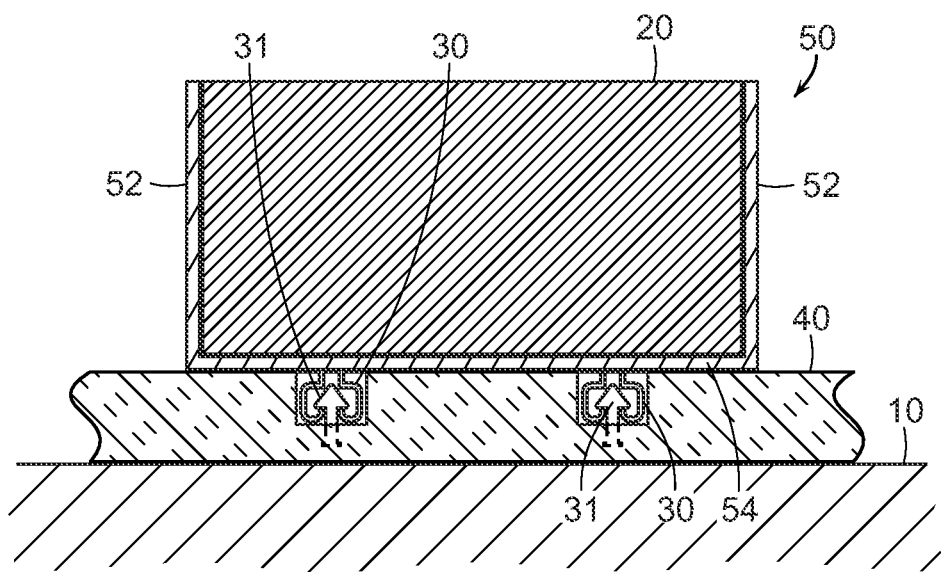
FIG. 8B shows a trim clip attached to insulation with male female attachment and a trim attached to the trim clip.

FIG. 8B shows another embodiment of the clip 50. The figure shows a trim 20 inserted into the clip. The clip has vertical sides 52 and a bottom 54. The figure shows an insulation board 40 attached to a wall 10 and the clip attached to the insulation board with wall mounting clip 30 and trim mounting clip 31.

Figure 9A:
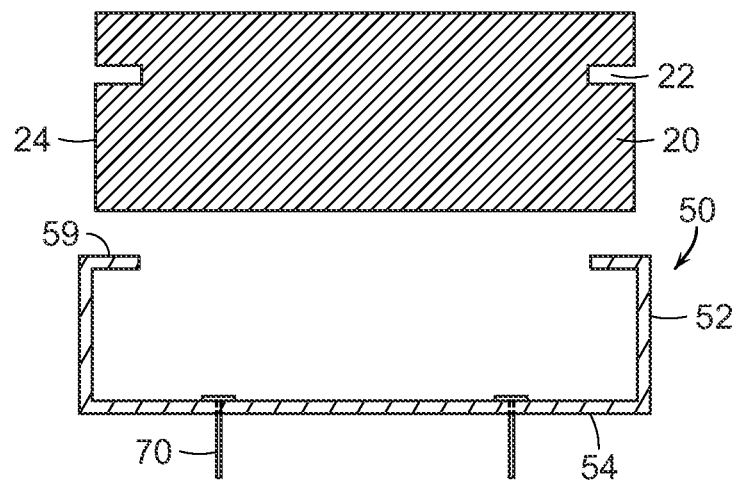
FIG. 9A shows an end view of an embodiment where the trim has attachment grooves and the trim clip have protrusions fitting into the grooves.
Figure 9B:
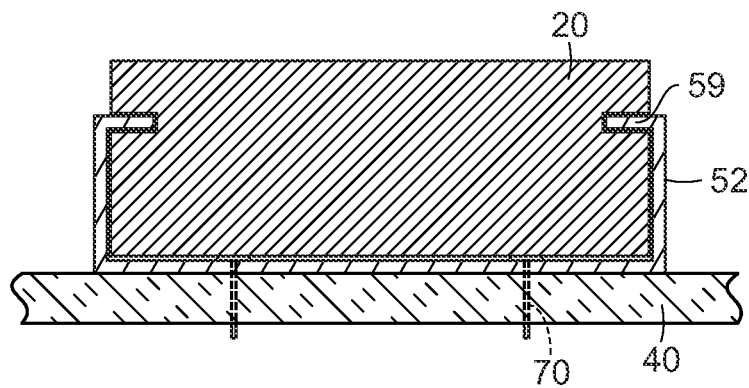
FIG. 9B shows the trim attached to the clip and the clip attached to insulation.
Figure 9C:
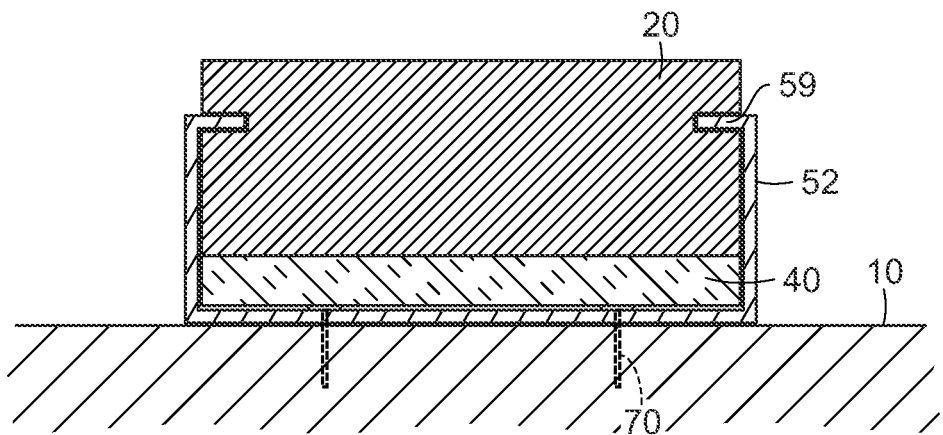
FIG. 9C shows the trim attached to insulation and the trim-insulation combination attached to the clip with the clip protrusions fitting into the trim grooves.

FIG. 9 shows yet another embodiment of the clip 50. FIG. 9A-C show the trim 20 with grooves 22 on both of its vertical sides 24. The figures show the clip 50 with vertical sides 52, bottom 54 and horizontal prong 59. Attachments 70 are also shown FIG. 9B shows the trim 20 inserted into the clip 50, the prongs 59 snugly fitting in the grooves 22. The figures shows the clip attached to insulation board 40 with attachments 70.

FIG. 9C shows the trim 20 attached to the insulation board 40 and the trim/insulation board combination inserted into the clip 50. The clip is attached to the wall 10 with the attachments 70.

Figure 10A:
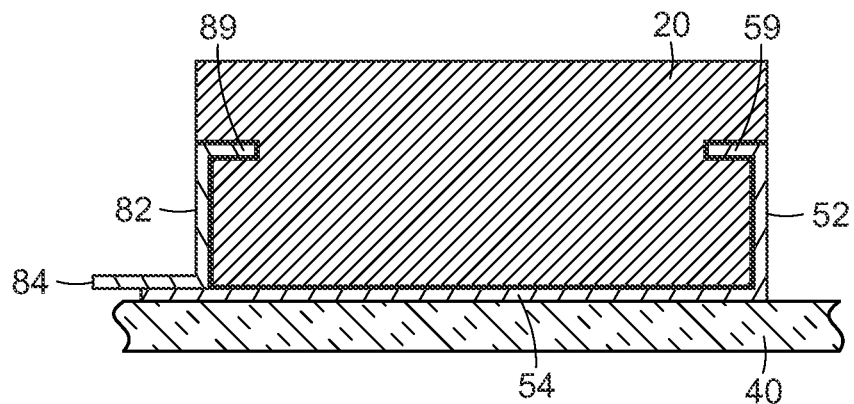
FIG. 10A and B show an embodiment where the clip of FIGS. 9A-C is formed of two parts.

FIG. 10A and B show another embodiment of the trim clip. The clip now consists of two parts. The first part has a bottom 54, a vertical side 52 and a horizontal prong 59. The second part has a bottom 84, a vertical side 82 and a horizontal prong 89. The bottom portion 84 of the second part slides on top of the bottom portion of the first part 54 whereby the width of the clip is adjustable.

Figure 10B:
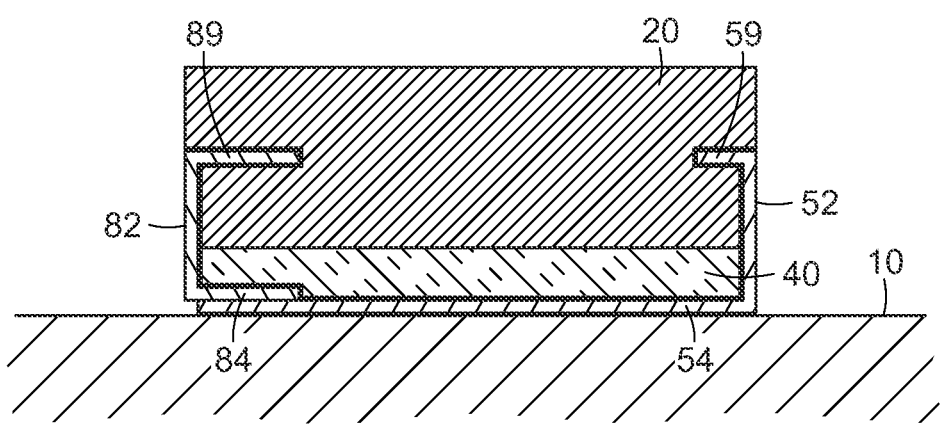

In FIG. 10A the horizontal prong 89 of the second part extends to opposite direction than the bottom part 84. In FIG. 10B the prong 89 and the bottom part 84 extend to same direction.

In FIG. 10A the trim 20 is inserted into the clip and the clip is attached to an insulation foam 40. In FIG. 10B the trim 20 is attached to foam 40 and the trim/foam combination is attached to a wall 10.

Referring now to FIGS. 1A and B, one preferred embodiment of this invention provides a pair of mounting clips to attach a trim board to a building wall. The pair of clips consists of a wall mounting clip 30 and a trim mounting clip 31. The wall mounting clip 30 is attached to the wall 10 and the trim mounting clip 31 is attached to the trim 20. As is shown in FIG. 1B the wall mounting clip 30 forms a female partner and the trim mounting clip 31 forms a male partner. However, one skilled in the art would understand that the invention embraces also an embodiment where the wall mounting clip 30 is a male partner and the trim mounting clip 31 is a female partner. According to this embodiment, by pressing the trim mounting clip 31 toward the wall mounting clip 30, the male/female design locks the clips together and holds the trim on the wall 10. It is understood by one skilled in the art, that the way how the female and male partners attach to each other is not a limiting element of this invention, but that any method resulting locking of the female and male partners together is within the scope of this invention. Accordingly, the clips may for example be hooks or hooks and loops that lock together.

Referring now to FIG. 2, another embodiment of the invention is shown. According to this invention, an insulation board 40 is glued on back of the trim 20. The trim mounting clips 31 are attached to the insulation board, and the wall mounting clips 30 are attached to the wall 10. Again by pressing the trim mounting clip 31 toward the wall mounting clip 30, the male/female design of the clips locks them together and holds the foam and the trim on the wall.

Referring now to FIG. 3 it is shown how the trim is easily attached to a corner of the house. In the shown embodiment the trim 20 on the corner is formed by two separate trims, but it is also possible to provide one trim that has a right angle, so that it fits to the corner. The mounting clips are attached close to the corner and further away from the corner.

FIG. 4 shows one embodiment of the male/female attachment device of the trim mounting clip/wall mounting clip pair. As is shown in the figure the trim mounting clip 31 snugly fits in the wall mounting clip 30. One skilled in the art would understand, that such male/female pairing can be achieved by various designs. Only illustrative design is shown here. According to a preferred embodiment the dimensions of the mounting clips is such that when the wall clip 30 is attached to the wall 10 and the trim clip 31 to the trim 20 or insulation foam 40, and the trim wall clip 30 is attached to the wall trim clip 31, the distance between the wall and the inner side of the trim or the insulation board is less than ¾", more preferably less than ½" and most preferably not more than ¼".

According to one preferred embodiment, the female and male partners are attached to the trim board, insulation board, or the siding board by screwing mechanism. According to another preferred embodiment the female and male partners are attached by pushing. According to yet another embodiment the attachment system may include tubular elements that are attached to the trim board, insulation board, or the siding board and the female and male partners are attached to these tubular elements.

Referring now to FIG. 5, an embodiment is shown where an insulation board 40 is glued on the inner side of the trim 20 and the trim/insulation combination is attached on wall 10 with male/female mounting clips 30, 31.

Referring now to FIGS. 6, according to one preferred embodiment the location of the mounting clips may be indicated on the top surface of the trim 20. This would help attaching the trim to the wall with the clips that remain invisible on the back side of the trim. According to a preferred embodiment the attachment with the male/female attachment device is meant to be a permanent attachment. However additional nails or other means for attachment may also be applied.

FIG. 7A shows an end view of a trim or a trim with insulation attached with the trim clip. The figure shows the trim clip 50 having a bottom 54 and two vertical sides 52. In other words, the clip is substantially U-formed. The inner surfaces of the clip sides are covered with rubber pads 60 or similar material. The trim 20 or the trim with insulation foam is inserted in between the two vertical clip sides. The width of the trim clip (i.e. distance between the rubber pads) is such that the trim snugly fits there and the rubber pads keep the trim secured in place. When insulation is attached to the trim (shown in FIG. 8A) the clip is attached directly to the wall 10. When the trim does not include insulation, then the clip is installed on the insulation of the wall structure. In this case the clip may have female/male attachment assembly to attach it to the insulation board (FIG. 8B).

FIG. 7B shows a top view of a trim clip of this invention. The clip 50 has two vertical sides 52 and a bottom side 54. The inner surfaces of the clip sides are covered with rubber pads 60 and the trim bottom has one or more attachment holes 56 for penetrating a nail or screw to attach the clip on the wall. The trim or the trim with insulation is then inserted in the clip between the rubber pads which securely hold the trim in its place.

FIG. 7C shows another embodiment of the invention. Here the trim clip 50 has two vertical sides 52 an a bottom 54. A squeezing lever 58 is attached to one or both of the vertical sides 52 of the clip. The trim 20 or the trim with insulation foam is inserted in the clip between the two vertical clip sides. When the lever is pushed down the trim side will bend inward and squeezes the trim inside the clip. The lever 58 may then be attached to the wall by nailing or gluing whereby the squeezing pressure of the clip is maintained and the trim or trim with insulation remains securely in place.

According to one embodiment of this invention the clip is substantially of the same length as the trim to be attached. According to another embodiment the length of the clip may vary between about an inch to the full length of the trim. When the trim is substantially shorter than the length to the trim multiple clips may be used to attach the trim.

FIG. 8A shows a trim clip with a trim 20 that is attached to insulation foam 40. The attachment may be done by wall clip/trim clip assembly 30/31, but other methods may also be used, such as gluing. The insulation foam has either a male attachment or a female attachment and the trim has the counterpart. Pushing the counterpart attachment together will lock them together and the trim 20 will hold on the insulation foam 40. The clip is attached directly to the wall and the rim with insulation attached to it is inserted into the trim clip.

FIG. 8B shows a trim clip without insulation. In this case the insulation board 40 is attached to the wall 10 and the insulation board has wall clip/trim clip assembly 30/31. The trim clip bottom 54 has the counterpart. Now pushing the counterpart attachment together will lock the parts and the clip will hold on the insulation board. The trim is then inserted into the trim clip.

FIG. 9A shows another embodiment of this invention. The vertical sides 52 of the clip 50 have short horizontal prong 59 at their upper end. The trim 20 in this case has been modified so that it has horizontal grooves 22 in its vertical sides 24. The prongs 59 snugly fit into the grooves 22, thereby locking the trim into its place. The clip is attached to the wall or to an insulation board with attachments 70. The attachments may be screws or nails but they may as well be the male/female mounting clips described above.

FIG. 9B shows the clip attached to an insulation board 40. The trim is in its place secured by the prongs 59 which are fitted into the grooves 22.

FIG. 9C shows an embodiment where the trim is attached to an insulation 40 and the insulation/trim combination is inserted into the trim clip. The clip is attached to a wall 10 with attachments 70. The attachment may be screws or nails but they may also be male/female mounting clips as described above. The trim may be glued onto the foam, but it may also be attached to the foam with male/female mounting clips as described above.

FIG. 10 shows still another embodiment. In this case the clip 50 is made of two parts. The first part has a long bottom part 54, a vertical side 52 and a short horizontal prong 59. The second part has a short bottom part 89, a vertical side 82 and a horizontal prong 89. The second part slides on top or under the first part so that the width of the clip is adjustable to trims with different widths. In one embodiment shown in FIG. 10A the prong 89 of the second part points to opposite direction than the bottom part 84 and in another embodiment shown in FIG. 10B the bottom part 84 and the prong 89 point to same direction.

In the embodiment shown in FIG. 10 the clip is attached to a insulation board or directly to a wall with attachments that may be nails, screws or male/female assembly shown above in this application. The clip may have several holes in the bottom parts 84 and 54 through which the attachments are attached, or the bottom parts may have elongated slots that coincide for attachments.

According to one preferred embodiment the vertical side 52/82 may be 1/16" to 1", more preferably the prong is 2/16" to 1/2" and most preferably the prong is about 5/16". One skilled in the art would understand that the vertical side can be of any length provided that it equals to the thickness of the trim (or trim plus insulation) or is shorter than the thickness. If the length is same as the thickness then the trim does not have the grooves but the horizontal prongs would in that case be on the trim surface.

According to one preferred embodiment the short bottom part 84 is between 1" and 3" and most preferably about 1.5". The long bottom part 54 is preferably 5-10" and most preferably about 7". However, one skilled in the art would understand that the length of the bottom parts can be adjusted to be anything and the most preferable measures are such that combination of the short and long bottom part would allow attachment of trims of any available widths.

According to one preferred embodiment the length of the horizontal prong 59/89 of the clip and the depth of the groove 22 in the trim is between 1/8" and 1", more preferably between 1/4" and 1/2" and most preferably about 3/8". Again the skilled artisan would understand that the length of the prong and the depth of the groove can be any reasonable measure as long as the prong fits into the groove and holds the trim in its position.

One skilled in the art would understand that the slidable two part clip shown in FIGS. 10A and B may also be used in connection with other embodiments of this invention, such as the clip having rubber liners as shown in FIG. 7. Also it is possible to use the male/female attachments in connection with the slidable two part embodiment.

It is understood by one skilled in the art that the method and devices described in this disclosure would be applicable to trim boards of any material, with or without the insulation layer and to trim boards of any size.

The trim clips 50 of this invention may be made of any feasible material, including but not limited to aluminum, plastic, fiber glass, Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A trim clip attaching a siding trim on a wall structure, said clip comprising;
    two vertical sides connected together with a substantially flat bottom having a width substantially similar to the width of the siding trim, wherein the bottom has attachment holes or a female/male attachment assembly, and wherein the trim clip is attached to the wall structure with fasteners through the attachment holes or with the female/male attachment assembly, and
    wherein the siding trim is inserted into the clip between the vertical sides and held in place by a pressure provided by the placement of the trim within the clip and by rubber pads attached to inner surfaces of the two vertical sides.

2. The trim clip of claim 1, wherein the pressure is provided by a lever squeezer attached on an outer surface of one of the vertical sides and pushing the lever squeezer down, whereby the at least one vertical side bends inward and thereby provides the pressure.

3. The trim clip of claim 1, having a the female/male attachment assembly, wherein the assembly comprises a male attachment and a female attachment, and wherein the bottom of the trim clip has one of the attachments of the clip, and an insulation foam of the wall structure has the other of the attachments and the clip is attached to the insulation foam by locking the female and male attachments.

4. A method to attach a siding trim on a wall, said method comprising the steps of:
    a) providing the trim having a width and providing the wall structure;
    b) providing at least one trim clip having two vertical sides connected together with a substantially flat bottom having a width substantially similar to the width of the siding trim,
    c) attaching the trim clip on the wall structure;
    d) inserting the siding trim into the clip between the vertical sides; and
    e) providing a pressure by rubber pads attached to inner sides of the vertical sides to the trim such that the trim stays securely between the sides.

5. The method of claim 4, wherein the pressure is provided by pushing down a lever squeezer attached on the outer side of at least one vertical side and attaching the lever squeezer in the wall structure.

6. An adjustable trim clip for attaching a siding trim on a wall structure,
    said clip comprising:
    a first part having a vertical side with a first end and a second end, said first end being attached to a flat solid bottom and said second end attached to a flat horizontal prong extending in the same direction and along the same plane as the flat bottom;
    a second part having a vertical side with a first end, a flat solid bottom, and a second end, said first end being attached to the flat bottom and said second end being attached in about 90 degrees angle to a flat horizontal prong extending along the same plane as the flat bottom; and
    wherein the flat bottom of the second part slides on top of or under the flat bottom of the first part, thereby forming a clip that has an adjustable width.

7. The clip of claim 6, wherein the horizontal prong of the second part extends along the same plane in the opposite direction of the flat bottom of the second part and wherein the flat bottom of the second part is shorter than the flat bottom of the first part.

8. The clip of claim 6, wherein the horizontal prongs snugly fit into horizontal grooves in vertical sides of a trim, thereby holding the trim in its place.

* * * * *